(12) United States Patent
Owoeye (10) Patent No.: US 11,815,030 B1
(45) Date of Patent: Nov. 14, 2023

(54) CONTRAIL SUPPRESSION SYSTEM

(71) Applicant: General Electric Company, Schenectady, NY (US)

(72) Inventor: Eyitayo James Owoeye, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/860,445

(22) Filed: Jul. 8, 2022

(51) Int. Cl.
*F02C 9/18* (2006.01)
*F02C 7/141* (2006.01)

(52) U.S. Cl.
CPC ............... *F02C 9/18* (2013.01); *F02C 7/141* (2013.01); *F05D 2220/323* (2013.01); *F05D 2270/081* (2013.01)

(58) Field of Classification Search
CPC .... F02C 7/08; F02C 7/10; F02C 7/141; F02C 6/08; F02C 3/30
See application file for complete search history.

(56) References Cited

U.S. PATENT DOCUMENTS

| | | | |
|---|---|---|---|
| 3,517,505 A | 6/1970 | Anderson et al. | |
| 5,269,135 A * | 12/1993 | Vermejan | F02C 7/04 60/266 |
| 7,870,717 B2 | 1/2011 | MacKnight | |
| 7,971,438 B2 | 7/2011 | Taylor et al. | |
| 8,492,736 B2 | 7/2013 | Wang et al. | |
| 8,955,302 B2 | 2/2015 | Van Straaten et al. | |
| 9,896,218 B2 | 2/2018 | Swann | |
| 10,138,758 B2 * | 11/2018 | Yagita | F01K 5/02 |
| 10,364,750 B2 | 7/2019 | Rambo | |
| 10,371,003 B2 | 8/2019 | Swann et al. | |
| 11,378,341 B2 * | 7/2022 | Staubach | F28D 7/04 |
| 11,480,103 B2 * | 10/2022 | Boucher | F02K 3/115 |
| 2005/0235627 A1 * | 10/2005 | Vandermolen | F02C 7/08 60/39.511 |
| 2015/0275758 A1 * | 10/2015 | Foutch | F02C 7/047 60/785 |
| 2016/0061060 A1 * | 3/2016 | Ekanayake | F02C 6/18 60/39.182 |
| 2017/0370657 A1 * | 12/2017 | Eleftheriou | F02C 7/10 |
| 2018/0058267 A1 * | 3/2018 | Uechi | F22B 1/18 |
| 2021/0001269 A1 | 1/2021 | Klingels | |

FOREIGN PATENT DOCUMENTS

| | | |
|---|---|---|
| CN | 113184196 A | 7/2021 |
| CN | 113864052 A | 12/2021 |
| WO | WO2022/028652 A1 | 2/2022 |

* cited by examiner

*Primary Examiner* — Thuyhang N Nguyen
(74) *Attorney, Agent, or Firm* — Dority & Manning, P.A.

(57) ABSTRACT

A contrail suppression system includes a shell having an exhaust gas inlet, an exhaust gas outlet, a condensate drain and a flow chamber in fluid communication with the exhaust gas inlet, the exhaust gas outlet and the condensate drain. The exhaust gas inlet is in fluid communication with a jet exhaust nozzle of a gas turbine engine. A first tube bundle is disposed within the flow chamber downstream from the exhaust gas inlet. The first tube bundle includes an inlet and an outlet. The inlet of the first tube bundle is fluidly connected to a first cooling medium source. A second tube bundle is disposed within the flow chamber downstream from the first tube bundle and upstream from the exhaust gas outlet. The second tube bundle includes an inlet and an outlet. The inlet of the second tube bundle is fluidly connected to a second cooling medium source.

20 Claims, 5 Drawing Sheets

CONTRAIL SUPPRESSION SYSTEM

FIELD

The present disclosure relates to a gas turbine engine and more particularly, to exhaust suppression in a gas turbine engine.

BACKGROUND

Gas turbine engines, such as turbofan engines, may be used for aircraft propulsion. Condensation trails (contrails) are typically formed when water molecules present in the exhaust gas from a turbofan engine becomes supersaturated after mixing with ambient air. These water molecules condense and quickly freeze into ice particles/crystals.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" or "turbomachinery" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The present disclosure is generally related to a contrail suppression system for a gas turbine engine. The formation of condensation trails (contrails) from gas turbine engine exhausts are suspected to have negative impact on climate conditions. Contrails are typically formed when water molecules present in exhaust gas becomes supersaturated after mixing with ambient air. These water molecules then condense and quickly freeze into ice particles/crystals. Contrails are known to form cirrus clouds and could sometimes persist for hours over several miles. Contrail formation is expected to be even more severe in hydrogen-fueled aircraft as compared to fossil-fueled aircraft since hydrogen combustion can release over 7 times more water.

This disclosure provides a contrail suppression system which incorporates a three-fluid shell and tube device such as a heat exchanger to suppress contrails from aircraft gas turbine engines, while minimizing exhaust gas pressure drop, thereby reducing any impact on overall engine thrust. The three-fluid heat exchanger works in suppressing contrails by first cooling the exhaust gas in a waste heat recovery (WHR) section and then dehumidifying the exhaust gas in a condenser section of the heat exchanger. The heat recovered in the WHR section is used to preheat compressed air from a low-pressure compressor to increase fuel efficiency while condensate water extracted from the condenser section of the heat exchanger may be injected either into the combustion chamber to help with nitrogen oxide (NOx) reduction, into a high-pressure turbine of the gas turbine engine for turbine blade cooling or may be stored in a storage tank or vessel aboard the aircraft or on the gas turbine engine.

In other embodiments, the heat exchanger for the contrail suppression system may be without the WHR section. It would only have the condenser section for dehumidifying the exhaust gas, which would eliminate the benefit of increased fuel efficiency and may result in lower effectiveness of contrail suppression.

Figure 1:
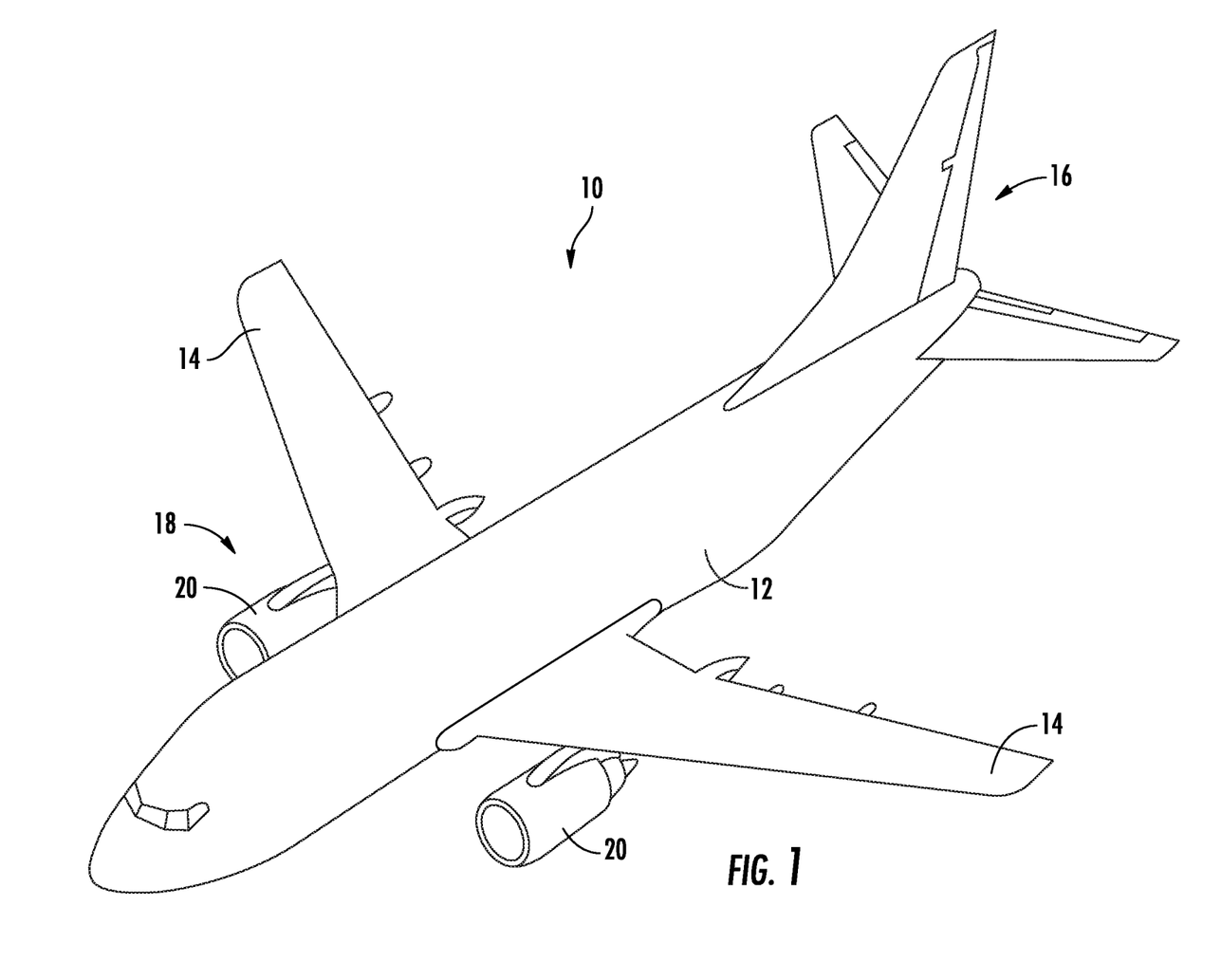
FIG. 1 is a perspective view of an exemplary aircraft in accordance with an exemplary aspect of the present disclosure.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
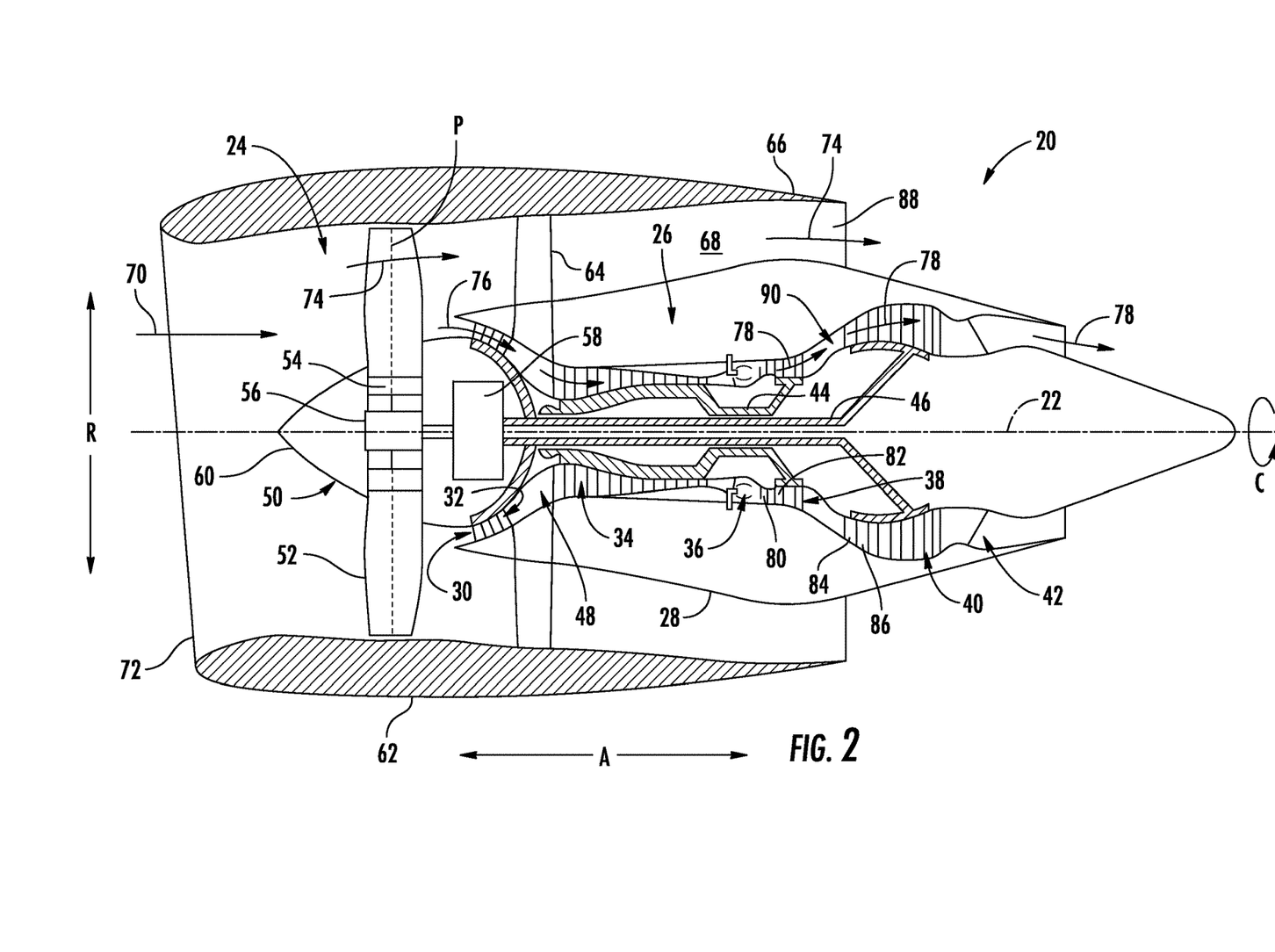
FIG. 2 is a cross-sectional view of an exemplary gas turbine engine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an engine casing 28 that defines an annular core inlet 30. The engine casing 28 at least partially encases, in serial flow relationship, a compressor section including a booster or low-pressure (LP) compressor 32 and a high-pressure (HP) compressor 34, a combustion section 36, a turbine section including a high-pressure (HP) turbine 38 and a low-pressure (LP) turbine 40, and a jet exhaust nozzle 42.

A high-pressure (HP) shaft 44 drivingly connects the (HP) turbine 38 to the (HP) compressor 34. A low-pressure (LP) shaft 46 that drivingly connects the (LP) turbine 40 to the (LP) compressor 32. The compressor section, combustion section 36, turbine section, and jet exhaust nozzle 42 together define a working gas flow path 48 through the gas turbine engine 20.

For the embodiment depicted, the fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a suitable pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the (LP) shaft 46 across the power gear box 58. The power gear box 58 includes a plurality of gears for adjusting a rotational speed of the fan 50 relative to a rotational speed of the (LP) shaft 46, such that the fan 50 and the (LP) shaft 46 may rotate at more efficient relative speeds.

Referring still to the exemplary embodiment of FIG. 2, the disk 54 is covered by rotatable front hub 60 of the fan section 24 (sometimes also referred to as a "spinner"). The front hub 60 is aerodynamically contoured to promote an airflow through the plurality of fan blades 52. Additionally, the exemplary fan section 24 includes an annular fan casing or outer nacelle 62 that circumferentially surrounds the fan 50 and/or at least a portion of the turbomachine 26. The nacelle 62 is supported relative to the turbomachine 26 by a plurality of circumferentially spaced struts or outlet guide vanes 64 in the embodiment depicted. Moreover, a downstream section 66 of the nacelle 62 extends over an outer portion of the turbomachine 26 to define a bypass airflow passage 68 therebetween.

It should be appreciated, however, that the exemplary gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (i.e., including the outer nacelle 62), in other embodiments, the gas turbine engine 20 may be an unducted or non-ducted gas turbine engine (such that the fan 50 is an unducted fan, and the outlet guide vanes 64 are cantilevered from the engine casing 28).

Additionally, or alternatively, although the gas turbine engine 20 depicted is configured as a geared gas turbine engine (i.e., including the power gear box 58) and a variable pitch gas turbine engine (i.e., including a fan 50 configured as a variable pitch fan), in other embodiments, the gas turbine engine 20 may be configured as a direct drive gas turbine engine (such that the (LP) shaft 46 rotates at the same speed as the fan 50), as a fixed pitch gas turbine engine (such that the fan 50 includes fan blades 52 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the nacelle 62 and fan section 24. As the volume of air 70 passes across the fan blades 52, a first portion of air 74 is directed or routed into the bypass airflow passage 68 and a second portion of air 76 is directed or routed into the working gas flow path 48, or more specifically into the (LP) compressor 32. The ratio between the first portion of air 74 and the second portion of air 76 is commonly known as a bypass ratio. Pressure of the second portion of air 76 is then increased as it is routed through the (HP) compressor 34 and into the combustion section 36, where it is mixed with fuel and burned to provide combustion gases 78.

The combustion gases 78 are routed through the (HP) turbine 38 where a portion of thermal and/or kinetic energy from the combustion gases 78 is extracted via sequential stages of (HP) turbine stator vanes 80 that are coupled to a turbine casing and (HP) turbine rotor blades 82 that are coupled to the (HP) shaft 44, thus causing the (HP) shaft 44 to rotate, thereby supporting operation of the (HP) compressor 34. The combustion gases 78 are then routed through the (LP) turbine 40 where a second portion of thermal and kinetic energy is extracted from the combustion gases 78 via sequential stages of (LP) turbine stator vanes 84 that are coupled to a turbine casing and (LP) turbine rotor blades 86 that are coupled to the (LP) shaft 46, thus causing the (LP) shaft 46 to rotate, thereby supporting operation of the (LP) compressor 32 and/or rotation of the fan 50.

The combustion gases 78 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 88 of the gas turbine engine 20, also providing propulsive thrust. The (HP) turbine 38, the (LP) turbine 40, and the fan nozzle exhaust section 88 at least partially define a hot gas path 90 for routing the combustion gases 78 through the turbomachine 26.

Figure 3:
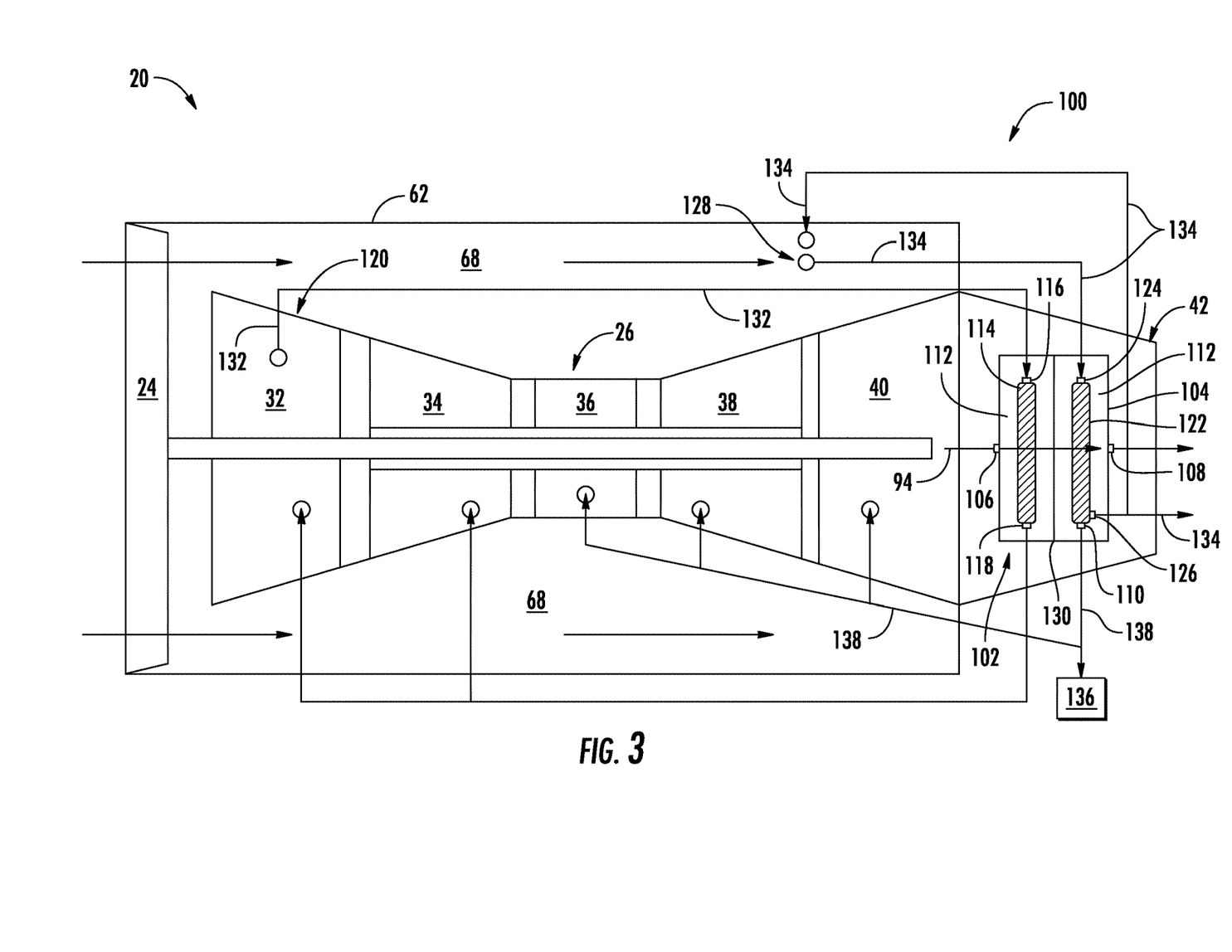
FIG. 3 is a schematic view of an exemplary gas turbine engine in accordance with an exemplary aspect of the present disclosure.

FIG. 3 is a schematic view of a portion of an exemplary gas turbine engine 20 shown in FIG. 2. FIG. 3 depicts, in serial flow order, the fan section 24, the (LP) compressor 32, the (HP) compressor 34, the combustion section 36, the (HP) turbine 38 and the (LP) turbine 40. FIG. 3 further depicts the nacelle 62 including the bypass airflow passage 68 and the jet exhaust nozzle 42. In exemplary embodiments, as illustrated in FIG. 3, the gas turbine engine 20 includes a contrail reduction or suppression system 100 herein denoted as system 100. The system 100 includes at least one heat exchanger 102 in fluid communication with the jet exhaust nozzle 42.

Figure 4:
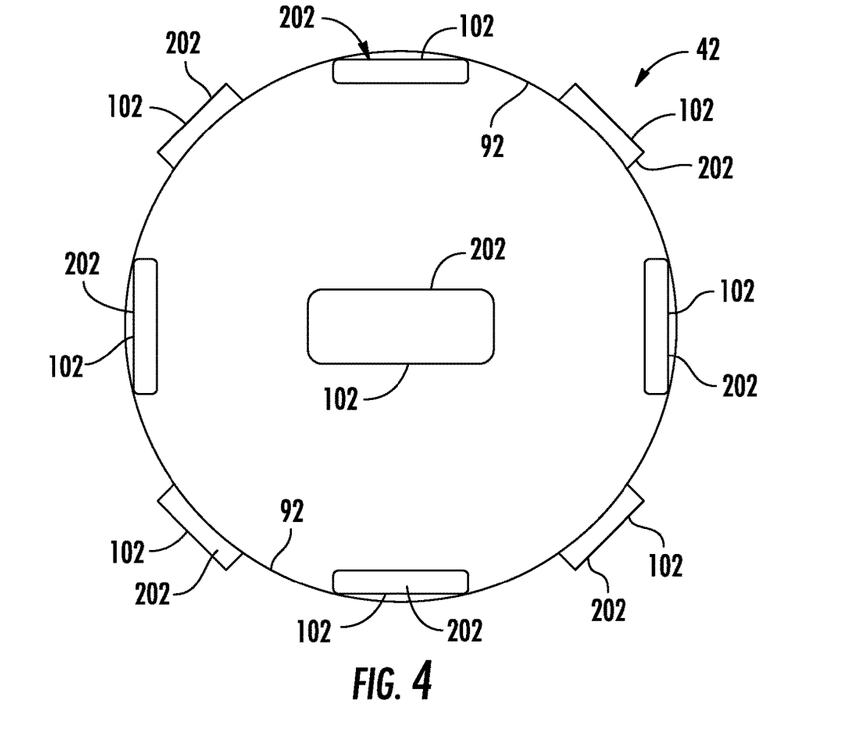
FIG. 4 is a forward-looking view of an aft end of an exemplary jet exhaust nozzle according to exemplary embodiments of the present disclosure.

FIG. 4 provides and forward-looking view of an aft end of the jet exhaust nozzle 42 according to various embodiments of the present disclosure. As shown in FIG. 4, the heat exchanger(s) 102 may be disposed inside the jet exhaust nozzle 42 at various locations. For example, the heat exchanger 102 may be positioned inside of the jet exhaust nozzle 42 or along an inner wall 92 of the jet exhaust nozzle 42. In embodiments wherein there are multiple heat exchangers 102, as show in FIG. 4, the heat exchangers 102 may be circumferentially spaced along the inner wall 92. In other embodiments, the heat exchanger 102 or one or more heat exchangers 102 may be positioned outside of the inner wall 92 of the jet exhaust nozzle 42.

Figure 5:
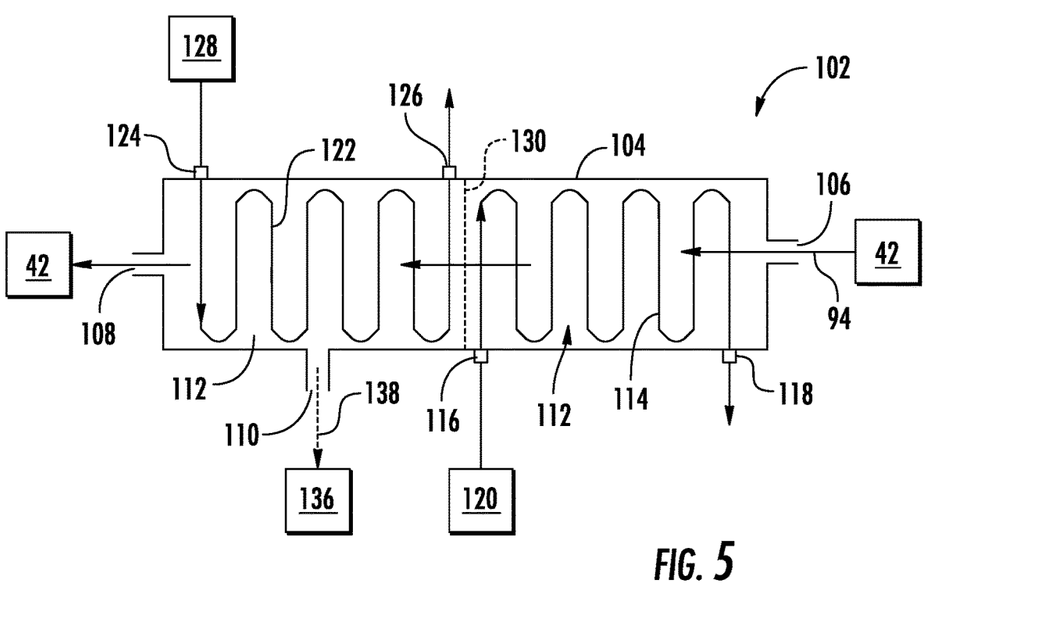
FIG. 5 is a schematic cross-sectional view of an exemplary heat exchanger according to exemplary embodiments of the present disclosure.

FIG. 5 provides a schematic view of an exemplary heat exchanger 102 according to various embodiments of the present disclosure. As shown in FIG. 3 and FIG. 5 collectively, the heat exchanger 102 includes a shell 104 having an exhaust gas inlet 106, an exhaust gas outlet 108, a condensate drain 110. The heat exchanger 102 further includes a flow chamber 112 defined within the shell 104 and in fluid communication with the exhaust gas inlet 106, the exhaust gas outlet 108 and the condensate drain 110. The exhaust gas inlet 106 and the exhaust gas outlet 108 are in fluid communication with the jet exhaust nozzle 42.

As further shown in FIG. 3 and FIG. 5 collectively, the heat exchanger 102 further includes a first tube bundle 114 disposed within the shell 104, and more particularly, within the flow chamber 112 downstream from the exhaust gas inlet 106. The first tube bundle 114 includes an inlet 116 and an outlet 118. The inlet 116 of the first tube bundle 114 is fluidly connected to a first cooling medium source 120.

The heat exchanger 102 further includes a second tube bundle 122 disposed within the shell 104, and more particularly, within the flow chamber 112 downstream from the first tube bundle 114 and upstream from the exhaust gas outlet 108. The second tube bundle 122 is fluidly isolated from the first tube bundle 114. The second tube bundle 122 includes an inlet 124 and an outlet 126. The inlet 124 of the second tube bundle 122 is fluidly connected to a second cooling medium source 128. In particular embodiments, the second cooling medium source 128 includes the nacelle 62 and or the bypass airflow passage 68.

In certain embodiments, the heat exchanger 102 includes one or more baffle plates 130, or other means for flow smoothing and/or for generating turbulence of exhaust gases 94 flowing from the low-pressure turbine 40. The baffle plate(s) 130 may have multiple perforations to enable uniform flow distribution as the exhaust gases 94 flow across them. The baffle plate(s) 130 is/are disposed within the shell 104, and more specifically, within the flow chamber 112. The baffle plate(s) 130 may increase heat transfer effectiveness of the heat exchanger 102 but may also result in slightly increased pressure drop of the exhaust gases in the shell 104.

In exemplary embodiments, the first cooling medium source 120 includes any one or any combination of the low-pressure compressor 32, the high-pressure compressor 34, or any other cooling medium source, such as but not limited to, an auxiliary cooling or waste heat recovery system of the gas turbine engine 20. In an exemplary embodiment, as shown in FIG. 3, the first cooling medium source includes the low-pressure compressor 32 with the inlet 116 of the first tube bundle 114 fluidly coupled thereto.

In an exemplary embodiment, as shown in FIG. 3, the outlet 118 of the first tube bundle 114 is fluidly coupled to the low-pressure compressor 32. In other embodiments, the outlet 118 of the first tube bundle 114 may be fluidly coupled to any one or any combination of the low-pressure compressor 32, the high-pressure compressor 34 or any other area of the gas turbine engine 20.

In exemplary embodiments, as shown in FIG. 3 and FIG. 5 collectively, the second cooling medium source 128 for providing a second cooling medium 134 comprises the bypass airflow passage 68. As shown in FIG. 3, the outlet 126 of the second tube bundle 122 is fluidly coupled to the bypass airflow passage 68. In addition or in the alternative, the outlet 126 of the second tube bundle 122 is in fluid communication with the jet exhaust nozzle 42.

In exemplary embodiments, as shown in FIG. 3 and FIG. 5 collectively, the condensate drain 110 may be fluidly coupled to at least one of the combustion section 36, the high-pressure turbine 38, and/or the low-pressure turbine 40. In addition, or in the alternative, the condensate drain 110 may be fluidly coupled to a storage tank 136. The storage tank 136 may be stored aboard the aircraft 10 or mounted to the gas turbine engine 20. The storage tank 136 may be removable or hard mounted.

Figure 6:
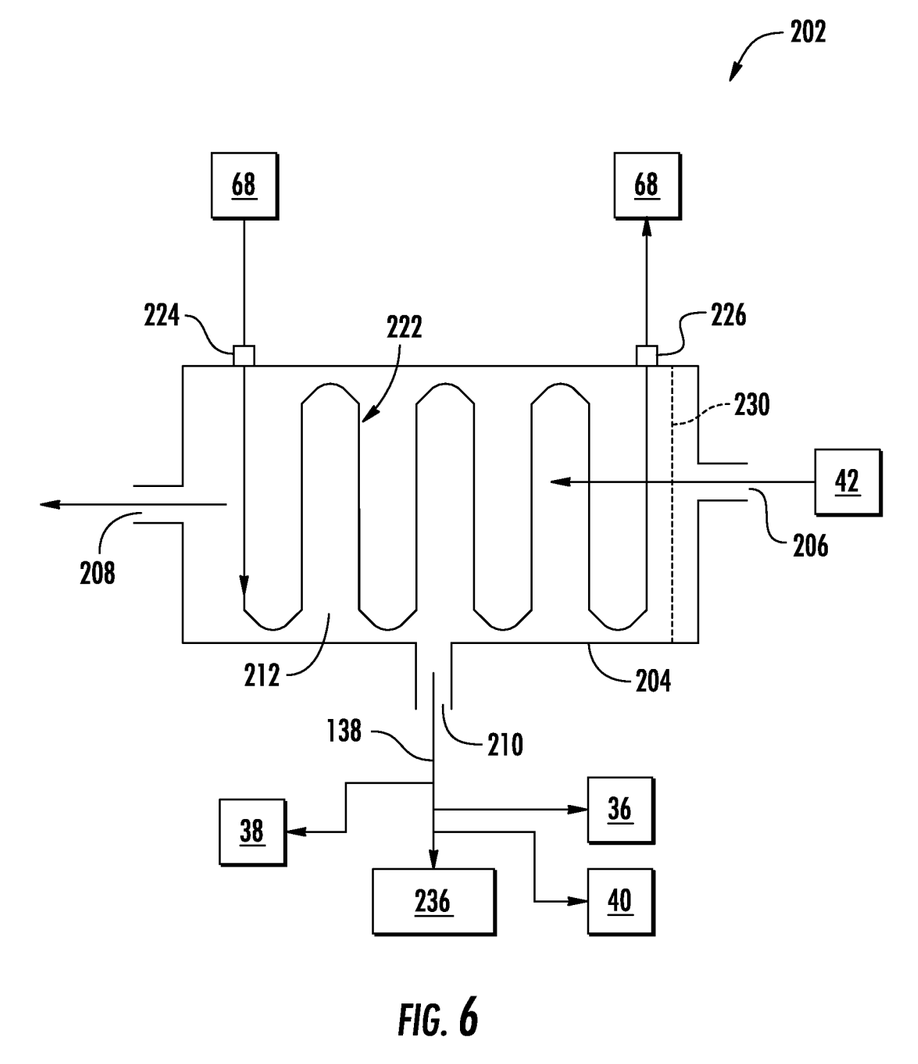
FIG. 6 is a schematic cross-sectional view of an exemplary heat exchanger according to exemplary embodiments of the present disclosure.

FIG. 6 is a schematic cross-sectional view of an exemplary heat exchanger 202 according to exemplary embodiment of the present disclosure. In the exemplary embodiment shown in FIG. 6, the heat exchanger 202 includes a shell 204 having an exhaust gas inlet 206, an exhaust gas outlet 208, a condensate drain 210 and a flow chamber 212 in fluid communication with the exhaust gas inlet 206, the exhaust gas outlet 208 and the condensate drain 210. The exhaust gas inlet 206 and exhaust gas outlet 208 are in fluid communication with the jet exhaust nozzle 42 of the gas turbine engine 20. In certain embodiments, the heat exchanger 202 includes one or more baffle plates 230, or other means for flow smoothing and/or for generating turbulence of exhaust gases 94.

A tube bundle 222 is disposed within the flow chamber 212 downstream of the exhaust gas inlet 206 and upstream of the exhaust gas outlet 208. The tube bundle 222 includes an inlet 224 and an outlet 226. The inlet 224 and the outlet 226 of the tube bundle 222 are fluidly connected to the bypass airflow passage 68. The condensate drain 210 is fluidly coupled to at least one of the combustion section 36, the high-pressure turbine 38, the low-pressure turbine 40, and a storage tank 236. The storage tank may be stored abord the gas turbine engine 20 or the aircraft 10.

As shown in FIG. 4, the heat exchanger(s) 202 may be disposed inside the jet exhaust nozzle 42 at various locations. For example, the heat exchanger 202 may be positioned inside of the jet exhaust nozzle 42 or along an inner wall 92 of the jet exhaust nozzle 42. In embodiments wherein there are multiple heat exchangers 202, as show in FIG. 4, the heat exchangers 202 may be circumferentially spaced along the inner wall 92. In other embodiments, the heat exchanger 202 or one or more heat exchangers 202 may be positioned outside of the inner wall 92 of the jet exhaust nozzle 42. In exemplary embodiments the system 100 may include both embodiments of heat exchanger 102 and 202.

In operation, the exhaust gases 94 flow from the low-pressure turbine 40 into the jet exhaust nozzle 42. At least a portion of the exhaust gases 94 are directed into the exhaust gas inlet 106 and into the flow chamber 112 of the heat exchanger 102. The first tube bundle 114 is charged with the first cooling medium 132 from the first cooling medium source 120. The exhaust gases 94 flow across the first tube bundle 114 to reduce the temperature of the exhaust gases 94 upstream from the second tube bundle 122. The second tube bundle 122 is charged with the second cooling medium 134 from the second cooling medium source 128. In other embodiments, fluid pump(s) (not shown) may be fluidly connected between the first cooling medium source 120 and the first tube bundle inlet 116, and/or between the second cooling medium source 128 and second tube bundle inlet 124, to boost the flow pressure of the first and/or second cooling media 132, 134.

The cooled exhaust gases 94 flow across the second tube bundle 122, thereby causing moisture from the exhaust gases to condense into water droplets. The water droplets flow out of/are removed from the shell 104 via the condensate drain 110. Condensate 138 may be collected in the storage tank 136, injected into the combustion section 36 to help reduce nitrogen oxide (NOx) emissions, injected into the high-pressure turbine 38 and/or the low-pressure turbine 40 for cooling purposes, or vented to atmosphere at an appropriate altitude or speed so as to not contribute to contrail formation. The storage tank 136 may be connected to a water treatment system (not shown) aboard the aircraft 10 or mounted to the gas turbine engine 20.

The condensate in the storage tank 136 may be directed to the water treatment system before sending the purified water into the cabin of the aircraft 10 for use in the lavatories, galleys, etc. Any unused condensate in the storage tank 136 may be periodically drained out when the aircraft 10 is on the ground (e.g. during refueling) or vented to atmosphere at an appropriate altitude or speed so as to not contribute to contrail formation.

Further aspects are provided by the subject matter of the following clauses:

A contrail suppression system, comprising a shell having an exhaust gas inlet, an exhaust gas outlet, a condensate drain and a flow chamber in fluid communication with the exhaust gas inlet, the exhaust gas outlet and the condensate drain. The exhaust gas inlet is in fluid communication with a jet exhaust nozzle of a gas turbine engine. A first tube bundle is disposed within the flow chamber downstream from the exhaust gas inlet. The first tube bundle includes an inlet and an outlet. The inlet of the first tube bundle is fluidly connected to a first cooling medium source. A second tube bundle is disposed within the flow chamber downstream from the first tube bundle and upstream from the exhaust gas outlet. The second tube bundle includes an inlet and an outlet. The inlet of the second tube bundle is fluidly connected to a second cooling medium source.

The contrail suppression system as in the preceding clause, wherein the first cooling medium source comprises a low-pressure compressor of the gas turbine engine.

The contrail suppression system as in any preceding clause, wherein the outlet of the first tube bundle is fluidly coupled to a low-pressure compressor of the gas turbine engine.

The contrail suppression system as in any preceding clause, wherein the outlet of the first tube bundle is fluidly coupled to a high-pressure compressor of the gas turbine engine.

The contrail suppression system as in any preceding clause, wherein the second cooling medium source comprises a bypass airflow passage of the gas turbine engine.

The contrail suppression system as in any preceding clause, wherein the outlet of the second tube bundle is fluidly coupled to a bypass airflow passage of the gas turbine engine.

The contrail suppression system as in any preceding clause, wherein the outlet of the second tube bundle is in fluid communication with the jet exhaust nozzle.

The contrail suppression system as in any preceding clause, wherein the exhaust gas outlet is in fluid communication with the jet exhaust nozzle.

The contrail suppression system as in any preceding clause, wherein the condensate drain is fluidly coupled to at least one of a combustion section, a high-pressure turbine, a low-pressure turbine of the gas turbine engine, and a storage tank.

A contrail suppression system, comprising a shell having an exhaust gas inlet, an exhaust gas outlet, a condensate drain and a flow chamber in fluid communication with the exhaust gas inlet, the exhaust gas outlet and the condensate drain, wherein the exhaust gas inlet and exhaust gas outlet are in fluid communication with a jet exhaust nozzle of a gas turbine engine. A tube bundle is disposed within the flow chamber downstream of the exhaust gas inlet and upstream of the exhaust gas outlet. The tube bundle including an inlet and an outlet, wherein the inlet and outlet of the tube bundle are fluidly connected to a bypass airflow passage, and wherein the condensate drain is fluidly coupled to at least one of a combustion section, a high-pressure turbine, and low-pressure turbine, and a storage tank.

The contrail suppression system as in the preceding clause, wherein the gas turbine engine is operably coupled to an aircraft.

An aircraft, comprising, a gas turbine engine including a jet exhaust nozzle, a first cooling medium source, and a second cooling medium source, and a contrail suppression system. The contrail suppression system comprising a shell having an exhaust gas inlet, an exhaust gas outlet, a condensate drain and a flow chamber in fluid communication with the exhaust gas inlet, the exhaust gas outlet and the condensate drain. The exhaust gas inlet is in fluid communication with the jet exhaust nozzle. A first tube bundle is disposed within the flow chamber downstream from the exhaust gas inlet. The first tube bundle includes an inlet and an outlet, wherein the inlet of the first tube bundle is fluidly connected to the first cooling medium source. A second tube bundle is disposed within the flow chamber downstream from the first tube bundle and upstream from the exhaust gas outlet. The second tube bundle includes an inlet and an outlet and the inlet of the second tube bundle is fluidly connected to the second cooling medium source.

The aircraft as in the preceding clause, wherein the first cooling medium source comprises a low-pressure compressor of the gas turbine engine.

The aircraft as in any preceding clause, wherein the outlet of the first tube bundle is fluidly coupled to a low-pressure compressor of the gas turbine engine.

The aircraft as in any preceding clause, wherein the outlet of the first tube bundle is fluidly coupled to a high-pressure compressor of the gas turbine engine.

The aircraft as in any preceding clause, wherein the second cooling medium source comprises a bypass airflow passage of the gas turbine engine.

The aircraft as in any preceding clause, wherein the outlet of the second tube bundle is fluidly coupled to a bypass airflow passage of the gas turbine engine.

The aircraft as in any preceding clause, wherein the outlet of the second tube bundle is in fluid communication with the jet exhaust nozzle.

The aircraft as in any preceding clause, wherein the exhaust gas outlet is in fluid communication with the jet exhaust nozzle.

The aircraft as in any preceding clause, wherein the condensate drain is fluidly coupled to at least one of a combustion section, a high-pressure turbine, and a low-pressure turbine of the gas turbine engine, and wherein the condensate drain is fluidly coupled to a storage tank.

A method for operating an aircraft, comprising flowing exhaust gases from the gas turbine engine into a flow chamber of a heat exchanger; charging a first tube bundle of the heat exchanger with a first cooling medium from a first cooling medium source; charging a second tube bundle of the heat exchanger with a second cooling medium from a second cooling medium source; and draining condensate from the exhaust gases away from the heat exchanger.

The method for operating an aircraft as in the preceding clause, further comprising boosting pressure of the first cooling medium via a pump from the first cooling medium source to the first tube bundle.

The method for operating an aircraft as in any preceding clause, further comprising boosting pressure of the second cooling medium via a pump from the second cooling medium source to the second tube bundle.

The method for operating an aircraft as in any preceding clause, further comprising collecting the condensate in a storage tank.

The method for operating an aircraft as in any preceding clause, further comprising injecting the condensate into a combustion section of the gas turbine engine.

The method for operating an aircraft as in any preceding clause, further comprising injecting the condensate into a high-pressure turbine of the gas turbine engine.

The method for operating an aircraft as in any preceding clause, further comprising injecting the condensate into a low-pressure turbine of the gas turbine engine.

The method for operating an aircraft as in any preceding clause, further comprising venting at least a portion of the condensate to atmosphere.

The method for operating an aircraft as in any preceding clause, further comprising routing the condensate to a storage tank.

The method for operating an aircraft as in any preceding clause, further comprising routing the condensate from the storage tank to a water treatment system aboard the aircraft.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A contrail suppression system, comprising:
    a shell having an exhaust gas inlet, an exhaust gas outlet, a condensate drain and a flow chamber in fluid communication with the exhaust gas inlet, the exhaust gas outlet and the condensate drain, wherein the exhaust gas inlet is in fluid communication with a jet exhaust nozzle of a gas turbine engine;
    a first tube bundle disposed within the flow chamber downstream from the exhaust gas inlet, wherein the first tube bundle includes an inlet and an outlet, wherein the inlet of the first tube bundle is fluidly connected to a first cooling medium source;
    a second tube bundle disposed within the flow chamber downstream from the first tube bundle and upstream from the exhaust gas outlet, wherein the second tube bundle includes an inlet and an outlet, wherein the inlet of the second tube bundle is fluidly connected to a second cooling medium source, wherein the second tube bundle is fluidly isolated from the first tube bundle within the flow chamber; and
    a baffle plate disposed within the flow chamber and configured to allow the exhaust gas to pass through;
    wherein the shell is disposed along one of an inner surface or an outer surface of the jet exhaust nozzle.

2. The contrail suppression system as in claim 1, wherein the first cooling medium source comprises a low-pressure compressor of the gas turbine engine.

3. The contrail suppression system of claim 1, wherein the outlet of the first tube bundle is fluidly coupled to a low-pressure compressor of the gas turbine engine.

4. The contrail suppression system of claim 1, wherein the outlet of the first tube bundle is fluidly coupled to a high-pressure compressor of the gas turbine engine.

5. The contrail suppression system as in claim 1, wherein the second cooling medium source comprises a bypass airflow passage of the gas turbine engine.

6. The contrail suppression system of claim 1, wherein the outlet of the second tube bundle is fluidly coupled to a bypass airflow passage of the gas turbine engine.

7. The contrail suppression system of claim 1, wherein the outlet of the second tube bundle is in fluid communication with the jet exhaust nozzle.

8. The contrail suppression system as in claim 1, wherein the exhaust gas outlet is in fluid communication with the jet exhaust nozzle.

9. The contrail suppression system as in claim 1, wherein the condensate drain is fluidly coupled to at least one of a combustion section, a high-pressure turbine and a low-pressure turbine of the gas turbine engine, and wherein the condensate drain is fluidly coupled to a storage tank.

10. A contrail suppression system, comprising:
    a shell having an exhaust gas inlet, an exhaust gas outlet, a condensate drain and a flow chamber in fluid communication with the exhaust gas inlet, the exhaust gas outlet and the condensate drain, wherein the exhaust gas inlet and the exhaust gas outlet are in fluid communication with a jet exhaust nozzle of a gas turbine engine, wherein the shell is disposed along one of an inner surface or an outer surface of the jet exhaust nozzle;
    a first tube bundle disposed within the flow chamber downstream from the exhaust gas inlet, wherein the first tube bundle includes an inlet and an outlet, wherein the inlet of the first tube bundle is fluidly connected to a first cooling medium source;
    a second tube bundle disposed within the flow chamber downstream from the first tube bundle and upstream of the exhaust gas outlet, the second tube bundle including an inlet and an outlet, wherein the inlet and outlet of the second tube bundle are fluidly connected to a bypass airflow passage, wherein the second tube bundle is fluidly isolated from the first tube bundle within the flow chamber;

a baffle plate disposed within the flow chamber and configured to allow the exhaust gas to pass through;

wherein the condensate drain is fluidly coupled to at least one of a combustion section, a high-pressure turbine, and low-pressure turbine, and a storage tank.

11. The contrail suppression system as in claim 10, wherein the gas turbine engine is operably coupled to an aircraft.

12. An aircraft, comprising:

a gas turbine engine including a jet exhaust nozzle, a first cooling medium source, and a second cooling medium source; and a contrail suppression system, comprising:
- a shell having an exhaust gas inlet, an exhaust gas outlet, a condensate drain and a flow chamber in fluid communication with the exhaust gas inlet, the exhaust gas outlet and the condensate drain, wherein the exhaust gas inlet is in fluid communication with the jet exhaust nozzle;
- a first tube bundle disposed within the flow chamber downstream from the exhaust gas inlet, wherein the first tube bundle includes an inlet and an outlet, wherein the inlet of the first tube bundle is fluidly connected to the first cooling medium source;
- a second tube bundle disposed within the flow chamber downstream from the first tube bundle and upstream from the exhaust gas outlet, wherein the second tube bundle includes an inlet and an outlet, wherein the inlet of the second tube bundle is fluidly connected to the second cooling medium source, wherein the second tube bundle is fluidly isolated from the first tube bundle within the flow chamber; and
- a baffle plate disposed within the flow chamber and configured to allow the exhaust gas to pass through;

wherein the shell is disposed along one of an inner surface or an outer surface of the jet exhaust nozzle.

13. The aircraft as in claim 12, wherein the first cooling medium source comprises a low-pressure compressor of the gas turbine engine.

14. The aircraft as in claim 12, wherein the outlet of the first tube bundle is fluidly coupled to a low-pressure compressor of the gas turbine engine.

15. The aircraft as in claim 12, wherein the outlet of the first tube bundle is fluidly coupled to a high-pressure compressor of the gas turbine engine.

16. The aircraft as in claim 12, wherein the second cooling medium source comprises a bypass airflow passage of the gas turbine engine.

17. The aircraft as in claim 12, wherein the outlet of the second tube bundle is fluidly coupled to a bypass airflow passage of the gas turbine engine.

18. The aircraft as in claim 12, wherein the outlet of the second tube bundle is in fluid communication with the jet exhaust nozzle.

19. The aircraft as in claim 12, wherein the exhaust gas outlet is in fluid communication with the jet exhaust nozzle.

20. The aircraft as in claim 12, wherein the condensate drain is fluidly coupled to at least one of a combustion section, a high-pressure turbine and a low-pressure turbine of the gas turbine engine, and wherein the condensate drain is fluidly coupled to a storage tank.

* * * * *